(12) United States Patent
Moon et al.

(10) Patent No.: US 11,706,495 B2
(45) Date of Patent: *Jul. 18, 2023

(54) APPARATUS AND SYSTEM FOR PROVIDING CONTENT BASED ON USER UTTERANCE

(71) Applicant: SAMSUNG ELECTRONICS CO., LTD., Suwon-si (KR)

(72) Inventors: Jibum Moon, Suwon-si (KR); Gyungchan Seol, Suwon-si (KR); Kyerim Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,521

(22) Filed: Jul. 22, 2022

(65) Prior Publication Data

US 2022/0360856 A1    Nov. 10, 2022

Related U.S. Application Data

(63) Continuation of application No. 16/963,694, filed as application No. PCT/KR2019/001936 on Feb. 19, 2019, now Pat. No. 11,432,045.

(30) Foreign Application Priority Data

Feb. 19, 2018    (KR) .................. 10-2018-0019405

(51) Int. Cl.
*H04N 21/472*    (2011.01)
*G06F 3/16*    (2006.01)
(Continued)

(52) U.S. Cl.
CPC ....... *H04N 21/47202* (2013.01); *G06F 3/167* (2013.01); *G10L 15/08* (2013.01);
(Continued)

(58) Field of Classification Search
CPC ... H04N 21/47202; G10L 15/08; G10L 15/22; G10L 15/30; G06F 3/167
See application file for complete search history.

(56) References Cited

U.S. PATENT DOCUMENTS 6,442,518 B1 * 8/2002 Van Thong ............. G10L 15/26
704/235
6,473,778 B1 * 10/2002 Gibbon ................. G06F 40/103
715/201

(Continued)

FOREIGN PATENT DOCUMENTS

KR    10-2013-0082835    7/2013
KR    10-2014-0066025    5/2014
(Continued)

OTHER PUBLICATIONS

International Search Report for PCT/KR2019/001936 dated Jun. 10, 2019, 5 pages.

(Continued)

*Primary Examiner* — Michael B. Pierorazio
(74) *Attorney, Agent, or Firm* — Nixon & Vanderhye, P.C.

(57) ABSTRACT

An example display device may include a voice signal receiver, a display, at least one memory storing an application supporting a contents providing service and storing instructions, a communication circuit communicating with at least one external server supporting the contents providing service, and at least one processor. The contents providing service may provide contents files of a first type and contents files of a second type.

20 Claims, 8 Drawing Sheets

(51) Int. Cl.
*G10L 15/08* (2006.01)
*G10L 15/22* (2006.01)
*G10L 15/30* (2013.01)

(52) U.S. Cl.
CPC ............. *G10L 15/22* (2013.01); *G10L 15/30* (2013.01); *G10L 2015/088* (2013.01); *G10L 2015/223* (2013.01)

(56) References Cited

U.S. PATENT DOCUMENTS

| | | | | |
|---|---|---|---|---|
| 7,047,191 | B2* | 5/2006 | Lange | G10L 15/26 704/235 |
| 7,065,524 | B1 | 6/2006 | Lee | |
| 7,092,888 | B1* | 8/2006 | McCarthy | G10L 15/063 704/277 |
| 7,509,385 | B1* | 3/2009 | Rittmeyer | G06Q 10/107 715/224 |
| 7,729,917 | B2* | 6/2010 | Miyamoto | G10L 15/22 704/275 |
| 7,739,253 | B1* | 6/2010 | Yanovsky | G06F 16/9535 707/706 |
| 7,801,910 | B2* | 9/2010 | Houh | G06F 16/583 707/765 |
| 7,873,654 | B2* | 1/2011 | Bernard | G06F 16/3329 709/219 |
| 7,962,331 | B2* | 6/2011 | Miller | G10L 15/01 704/235 |
| 8,121,432 | B2* | 2/2012 | Dorai | G06F 16/7844 382/276 |
| 8,131,545 | B1* | 3/2012 | Moreno | G10L 15/04 704/235 |
| 8,423,363 | B2* | 4/2013 | Gupta | G10L 15/22 704/251 |
| 8,572,488 | B2* | 10/2013 | Phillips | G06F 16/7834 715/716 |
| 9,230,543 | B2* | 1/2016 | Kim | G10L 15/1822 |
| 9,380,330 | B2* | 6/2016 | Shin | G10L 19/265 |
| 9,456,254 | B2* | 9/2016 | Sung | H04N 21/251 |
| 9,620,109 | B2* | 4/2017 | Song | G10L 15/22 |
| 10,555,041 | B2* | 2/2020 | Sim | H04N 5/60 |
| 11,432,045 | B2* | 8/2022 | Moon | G10L 15/22 |
| 2001/0025241 | A1* | 9/2001 | Lange | G10L 15/26 704/235 |
| 2002/0055950 | A1* | 5/2002 | Witteman | G06F 16/40 707/E17.009 |
| 2002/0093591 | A1* | 7/2002 | Gong | G06F 16/739 348/E7.063 |
| 2003/0025832 | A1* | 2/2003 | Swart | H04N 21/234309 348/E7.071 |
| 2003/0061028 | A1* | 3/2003 | Dey | G06F 16/40 704/9 |
| 2003/0169366 | A1* | 9/2003 | Lenzi | H04N 7/10 348/461 |
| 2003/0206717 | A1* | 11/2003 | Yogeshwar | G06F 16/71 386/328 |
| 2004/0096110 | A1* | 5/2004 | Yogeshwar | G06F 16/51 707/E17.031 |
| 2005/0227614 | A1* | 10/2005 | Hosking | H04N 7/165 455/3.06 |
| 2006/0015339 | A1* | 1/2006 | Charlesworth | G10L 15/187 704/E15.02 |
| 2007/0112837 | A1* | 5/2007 | Houh | G06F 16/78 707/E17.02 |
| 2007/0124147 | A1* | 5/2007 | Gopinath | G10L 15/19 704/E15.021 |
| 2007/0124788 | A1* | 5/2007 | Wittkoter | H04N 7/165 348/E7.071 |
| 2007/0214164 | A1 | 9/2007 | MacLennan | |
| 2008/0066138 | A1* | 3/2008 | Bishop | G06F 40/58 725/137 |
| 2008/0162471 | A1* | 7/2008 | Bernard | G06F 16/3329 707/999.005 |
| 2008/0175556 | A1* | 7/2008 | Dorai | G06F 16/7844 707/E17.028 |
| 2008/0255844 | A1* | 10/2008 | Wu | G10L 15/193 704/E15.022 |
| 2008/0266449 | A1* | 10/2008 | Rathod | H04N 21/8133 348/E7.001 |
| 2008/0270134 | A1* | 10/2008 | Miyamoto | H04N 7/0885 348/E7.001 |
| 2009/0043576 | A1* | 2/2009 | Miller | G10L 15/063 704/231 |
| 2009/0112592 | A1* | 4/2009 | Candelore | H04N 21/4828 704/E15.001 |
| 2009/0171662 | A1* | 7/2009 | Huang | G10L 15/1822 704/E15.041 |
| 2010/0091187 | A1* | 4/2010 | Topiwalla | H04N 21/4355 348/E7.003 |
| 2010/0162294 | A1* | 6/2010 | Yin | H04N 21/41407 725/30 |
| 2010/0179811 | A1* | 7/2010 | Gupta | G10L 15/22 704/E15.044 |
| 2011/0022386 | A1* | 1/2011 | Gatzke | G10L 15/26 704/235 |
| 2011/0040559 | A1* | 2/2011 | Kim | G10L 15/26 704/271 |
| 2011/0239119 | A1* | 9/2011 | Phillips | G06F 16/7834 715/731 |
| 2012/0016678 | A1* | 1/2012 | Gruber | H04M 1/6091 704/E21.001 |
| 2012/0101817 | A1* | 4/2012 | Mocenigo | G10L 15/063 704/E15.001 |
| 2012/0253799 | A1* | 10/2012 | Bangalore | G10L 15/183 704/E15.001 |
| 2013/0159003 | A1* | 6/2013 | Kim | G10L 25/54 704/E21.001 |
| 2014/0143809 | A1* | 5/2014 | Sung | H04N 21/6581 725/37 |
| 2015/0201246 | A1* | 7/2015 | Son | G10L 17/22 725/53 |
| 2015/0243281 | A1* | 8/2015 | Song | G10L 15/22 704/251 |
| 2016/0286256 | A1 | 9/2016 | Shin et al. | |
| 2017/0214960 | A1* | 7/2017 | Kim | H04N 21/4345 |

FOREIGN PATENT DOCUMENTS

| | | |
|---|---|---|
| KR | 10-2014-0089877 | 7/2014 |
| KR | 10-2015-0084520 | 7/2015 |
| KR | 10-2015-0100322 | 9/2015 |
| KR | 10-2016-0039830 | 4/2016 |
| KR | 10-2016-0084059 | 7/2016 |
| KR | 10-2017-0087712 | 7/2017 |

OTHER PUBLICATIONS

Written Opinion of the ISA for PCT/KR2019/001936 dated Jun. 10, 2019, 7 pages.
Moon et al., U.S. Appl. No. 16/963,694, filed Jul. 21, 2020, allowed.

* cited by examiner

| NUMBER OF SEARCH RESULT OF CHANNEL NAME | NUMBER OF EPG SEARCH RESULT (PROJECT NAME, GENRE NAME, TITLE NAME) | NUMBER OF VOD SEARCH RESULT (CONTENTS NAME) | NUMBER OF APP SEARCH RESULT (App NAME) | CHOOSE PLANE RESULTS |
|---|---|---|---|---|
| 1 | 0 | 0 | 0 | direct channel tune |
| 0 | 1 | 0 | 0 | direct channel tune |
| 0 | 0 | 1 | 0 | VOD Chooser |
| 0 | 0 | 0 | 1 | App Launch |
| 1 | 1 | 0 | 0 | Channel Chooser |
| 1 | 0 | 1 | 0 | direct channel tune |
| 1 | 0 | 0 | 1 | direct channel tune |
| 0 | 1 | 1 | 0 | direct channel tune |
| 0 | 1 | 0 | 1 | direct channel tune |
| 0 | 0 | 1 | 1 | VOD Chooser |
| 1 | 1 | 1 | 0 | Channel Chooser |
| 1 | 1 | 0 | 1 | Channel Chooser |
| 1 | 0 | 1 | 1 | direct channel tune |
| 0 | 1 | 1 | 1 | direct channel tune |
| 1 | 1 | 1 | 1 | Channel Chooser |
| n | 0 | 0 | 0 | Channel Chooser |
| 0 | n | 0 | 0 | Channel Chooser |
| 0 | 0 | n | 0 | VOD Chooser |
| 0 | 0 | 0 | n | App Chooser |
| n | n | 0 | 0 | Channel Chooser |
| n | 0 | n | 0 | Channel Chooser |
| n | 0 | 0 | n | Channel Chooser |
| 0 | n | n | 0 | Channel Chooser |
| 0 | n | 0 | n | Channel Chooser |
| 0 | 0 | n | n | VOD Chooser |
| n | n | n | 0 | Channel Chooser |
| n | n | 0 | n | Channel Chooser |
| n | 0 | n | n | Channel Chooser |
| 0 | n | n | n | Channel Chooser |
| n | n | n | n | Channel Chooser |

APPARATUS AND SYSTEM FOR PROVIDING CONTENT BASED ON USER UTTERANCE

CROSS-REFERENCE TO RELATED APPLICATIONS

This application is a continuation of U.S. application Ser. No. 16/963,694, filed on Jul. 21, 2020, now U.S. Pat. No. 11,432,045, which is the U.S. national phase of International Application No. PCT/KR2019/001936 filed Feb. 2, 2019, which designated the U.S. and claims priority to Korean Patent Application No. 10-2018-0019405, filed on Feb. 19, 2018. The contents of each of these applications are incorporated herein in their entirety.

BACKGROUND

Field

Embodiments disclosed in this specification are related to a technology of grasping a user's intent from a user's utterance and providing contents based on the identified intent.

Description of Related Art

Electronic devices may provide various services based on speech recognition. For example, portable electronic devices such as smartphones or tablets or home appliance devices such as smart TVs may provide various services by recognizing a user's utterance in a state where a speech recognition service is executed and executing an operation corresponding to the utterance.

Contents providers may provide various contents through portable electronic devices or home appliances including a display. The contents providers may receive the user's utterance (e.g., voice commands) and may provide contents matched with the intent included in the user's utterance.

SUMMARY

When the intent of a user utterance is unclear, contents providers may provide several contents assumed as the intent of the user. For example, the contents providers may select contents, which the user wants to receive, based on the name of contents or the type of contents included in the user's utterance. When there are a plurality of contents with the same name or the same type, the contents providers may receive an utterance command that makes it possible to provide all of the plurality of contents or to select one of the plurality of contents from the user.

However, when the plurality of contents are provided at once, the user needs to select the intended contents among many provided contents, and thus it is difficult for the user to intuitively select desired contents. Besides, it may be inconvenience for the user to speak again, and the time required to receive the desired contents may be delayed.

To solve the above-mentioned problems, the disclosure is to provide a system and device for selectively providing contents matched with the user's intent based on the user's utterance.

According to an embodiment disclosed in this specification, a display device may include a voice signal receiver, a display, at least one memory storing an application supporting a contents providing service and storing instructions, a communication circuit communicating with at least one external server supporting the contents providing service, and at least one processor. The instructions may, when executed, cause the at least one processor to execute the application in response to a user input, to obtain an utterance for making a request for at least one content to the contents providing service through the voice signal receiver, to transmit the obtained utterance through the communication circuit to the at least one external server, and when the utterance includes a first keyword associated with the first type and a second keyword associated with the second type, to display a screen associated with at least one contents file of the first type through the display. The contents providing service may provide contents files of a first type and contents files of a second type. Other various embodiments as understood from the specification are also possible.

Furthermore, according to an embodiment disclosed in this specification, a system may include an electronic device including a voice signal receiver and a display, a first server including at least one first processor providing a speech recognition service, and a second server including at least one second processor supporting a contents providing service and storage storing a contents database storing a plurality of contents files corresponding to one type of a first type and a second type. The at least one first processor may be configured to receive an utterance from the electronic device, to extract a keyword associated with the plurality of contents from the utterance, and to transmit a command for making a request for at least one contents file of the first type to the electronic device when at least one contents file of the first type and at least one contents file of the second type, which correspond to the keyword, are included in the contents database. The at least one second processor may be configured to receive the command from the electronic device and to transmit the at least one contents file of the first type to the electronic device in response to receiving the command.

Moreover, according to an embodiment disclosed in this specification, a system supporting a contents providing service may include an electronic device including a voice signal receiver and a display, a server including at least one processor providing the contents providing service and storage storing a contents database storing a plurality of contents files corresponding to one type of a first type and a second type. The at least one processor may be configured to receive an utterance from the electronic device, to extract a keyword associated with the plurality of contents from the utterance, and to transmit the at least one contents file of the first type to the electronic device in response to receiving the command when at least one contents file of the first type and at least one contents file of the second type, which correspond to the keyword, are included in the contents database.

According to embodiments disclosed in the specification, the contents selected to be matched with the user's intent may be immediately provided to a user.

Besides, a variety of effects directly or indirectly understood through the disclosure may be provided.

BRIEF DESCRIPTION OF THE DRAWINGS

FIG. 5 is a view for describing a method of providing broadcast contents according to various embodiments.

With regard to description of drawings, the same or similar components may be marked by the same or similar reference numerals.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure. With regard to description of drawings, similar components may be marked by similar reference marks/numerals.

Figure 1:
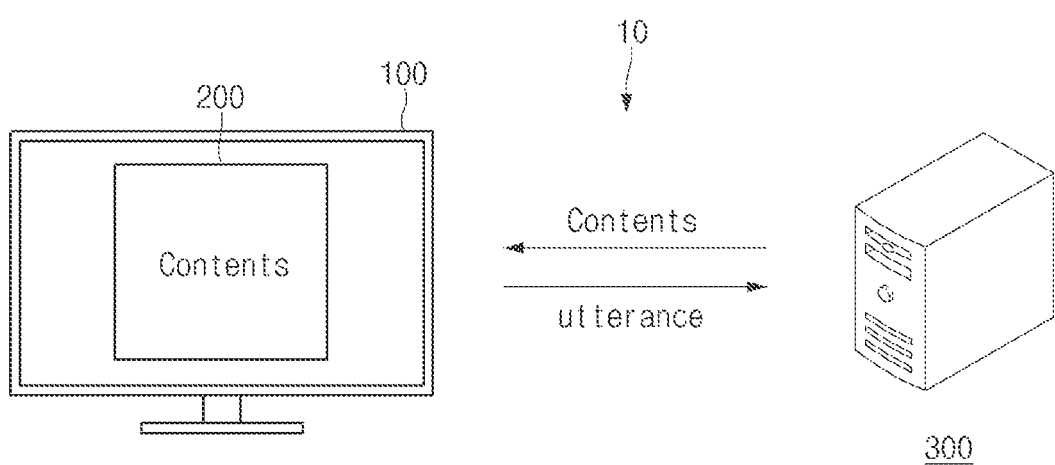
FIG. 1 is a view for describing the operating environment of a contents providing system according to an embodiment.

FIG. 1 is a view for describing the operating environment of a contents providing system according to an embodiment.

A contents providing system 10 according to an embodiment may support an utterance-based contents providing service. The contents providing system 10 may include an electronic device 100 and a server 300.

In an embodiment, the server 300 may receive a user's utterance from the electronic device 100. The server 300 may grasp contents 200 intended by the user, from the user's utterance. The server 300 may transmit the contents 200 intended by the user, to the electronic device 100 in response to receiving an utterance.

The contents providing service may provide the contents 200, for example, video files such as TV programs, movies, or the like, and image files such as photos, and the like. The server 300 may provide the electronic device 100 with contents required by the user, through the contents providing service. The electronic device 100 may display the received contents 200 on a display. The electronic device 100 may be referred to as an electronic device including a display, for example, a portable electronic device such as a smart phone, a home appliance such as a TV, or a PC.

In various embodiments, the contents providing system 10 may include a plurality of servers 300 providing contents 200 different from one another. A single server is illustrated in FIG. 1, but it is not limited thereto. For example, the contents providing system 10 may include a server providing real-time broadcast contents, a server providing video contents, a server providing audio files, image files, video files, or the like uploaded from users, depending on a type of service to be provided.

Figure 2:
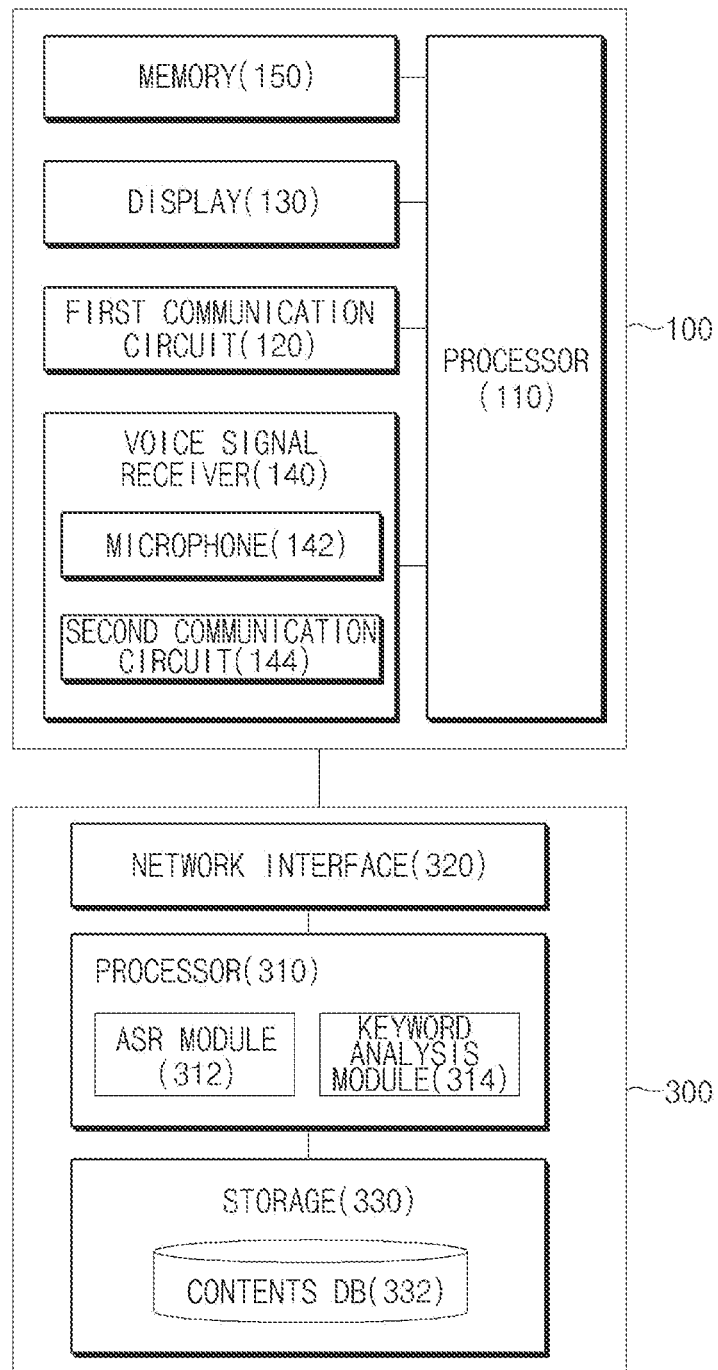
FIG. 2 is a block diagram of a server and an electronic device included in a contents providing system according to an embodiment.

FIG. 2 is a block diagram of a server and an electronic device included in a contents providing system according to an embodiment.

The electronic device 100 according to an embodiment may include a processor 110, a first communication circuit 120, a display 130, and a voice signal receiver 140. The processor 110 of the electronic device 100 may be configured to support an utterance-based contents providing service. The processor 110 of the electronic device 100 may be configured to perform necessary operations to support the contents providing service. The server 300 according to an embodiment may include a processor 310, a network interface 320, and storage 330.

In an embodiment, the voice signal receiver 140 of the electronic device 100 may include a microphone 142 and/or a second communication circuit 144. The electronic device 100 may receive a voice signal corresponding to a user's utterance through the voice signal receiver 140. The voice signal receiver 140 may be referred to as a voice signal receiving circuit including the microphone 142 and/or the second communication circuit 144.

In an embodiment, the electronic device 100 may receive a user utterance through the microphone 142. For example, the user may perform an utterance toward the microphone 142 provided in a part of the electronic device 100.

In an embodiment, the electronic device 100 may receive the user utterance obtained by an external device (e.g., a remote controller or a smartphone) through the second communication circuit 144. For example, the electronic device 100 may transmit and receive data to and from the external device through the second communication circuit 144. In various embodiments, the second communication circuit 144 may be implemented integrally with the first communication circuit 120.

For example, the electronic device 100 may transmit and receive data with a remote controller for controlling the electronic device 100 through the second communication circuit 144. The electronic device 100 may receive a user utterance from the remote controller. The remote controller may include a microphone and may obtain the user's utterance through the microphone.

For another example, the electronic device 100 may receive a user utterance from an external device (e.g., a smart phone, or the like) including a microphone through the second communication circuit 144. The external device may receive a voice signal through a microphone included in the external device and may transmit the received voice signal to the electronic device 100.

For example, the user utterance may be referred to as a voice command for receiving contents. The electronic device 100 may transmit the utterance to the server 300 through the contents providing service. For example, the electronic device 100 may transmit the user's utterance to the server 300 through the first communication circuit 120. The server 300 may receive the user's utterance from the electronic device 100 through the network interface 320.

In an embodiment, the server 300 may grasp the user's intent from the received utterance and may transmit contents matched with the user's intent to the electronic device 100.

In the embodiment, the processor 310 of the server 300 may be configured to support the contents providing service based on a user's utterance (a voice command). The processor 310 may include an automatic speech recognition (ASR) module 312 and a keyword analysis module 314.

In an embodiment, the processor 310 may drive the ASR module 312 and the keyword analysis module 314 by executing instructions stored in a memory (e.g., the storage 330). The modules may be implemented in hardware or software. In various embodiments of the disclosure, it is understood that the operation executed by the ASR module 312 and the keyword analysis module 314 is the operation executed by the processor 310.

According to an embodiment, the ASR module 312 may convert the user utterance received from the electronic device 100 into text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using information associated with phonation and unit phoneme information.

According to an embodiment, the keyword analysis module 314 may extract keywords associated with contents from the converted text data. For example, the keyword may be referred to as a word associated with contents, such as a type of contents file, a file name, meta data, or the like. The server 300 may specify the provided contents and keywords for the contents in advance to store the specified result in a contents database 332. When a keyword is extracted by the keyword analysis module 314, the server 300 may search for contents corresponding to the keyword in the contents database 332 of the storage 330.

According to an embodiment, the keyword analysis module 314 may extract keywords by performing syntactic analysis or semantic analysis, and may grasp the user's intent. The syntactic analysis may divide the user input into syntactic units (e.g., words, phrases, morphemes, and the like) and may determine which syntactic elements the divided units have. The semantic analysis may be performed by using semantic matching, rule matching, formula matching, or the like. Accordingly, the keyword analysis module 314 may obtain the intent of the user.

According to an embodiment, the keyword analysis module 314 may grasp the meaning of words extracted from a user input, using linguistic features (e.g., syntactic elements) such as morphemes, phrases, and the like. In addition, the keyword analysis module 314 may determine the intent of the user by matching the meaning of the grasped word to the intent. In addition, the pre-stored keyword matched with a word among the extracted words may be determined as a keyword of the utterance.

For example, the keyword analysis module 314 may generate a path rule based on the intent and keyword of the user input. For example, the keyword analysis module 314 may select the contents to be provided, based on the intent of the user input. The keyword analysis module 314 may generate a path rule that allows the electronic device 100 to play and execute the selected contents. According to an embodiment, the path rule generated by the keyword analysis module 314 may include contents to be played or executed, and information necessary to play or execute the contents. For example, the keyword analysis module 314 may transmit a path rule generated in response to a user utterance and contents corresponding to the user's intent, to the user terminal 100.

In an embodiment, when there are a plurality of contents corresponding to keywords, the server 300 may select the contents most matched with the user's intent among a plurality of found contents and may transmit the selected contents to the electronic device 100. Hereinafter, reference numerals in FIG. 2 may be cited to components identical or similar to components in FIG. 2.

In various embodiments, the contents capable of being provided by the contents providing system 300 may be changed in real time. Alternatively, the type and contents of the contents provided by the contents providing system 300 may vary depending on the environment of the electronic device 100 playing or executing the contents. The list of providable contents that may be stored in the contents database 332 and may be updated at predetermined intervals.

In various embodiments, the contents providing system 10 may provide broadcast contents. For example, a service for providing broadcast contents may provide real-time broadcast contents, video on demand (VOD) contents, and related application contents. The user may watch real-time broadcast or VOD contents through a contents providing service and may watch the contents received through related applications. Hereinafter, the contents providing system 10 for providing broadcast contents among various embodiments will be described as an example.

The contents database 332 may store list information of available contents. For example, the broadcast contents may be changed in real time depending on broadcast schedules of broadcasters. The VOD contents may be updated at a predetermined period. The contents related to the providable application may vary depending on the list of applications installed in the electronic device 100. The list of available contents may be updated at predetermined intervals.

In various embodiments, the server 300 may include a plurality of servers. For example, a plurality of servers may cooperate with one another to perform the function of the server 300. The operations of the processor 310 included in the server 300 may be performed by a plurality of servers. The example related to this will be described later with reference to FIG. 8.

Figure 3:
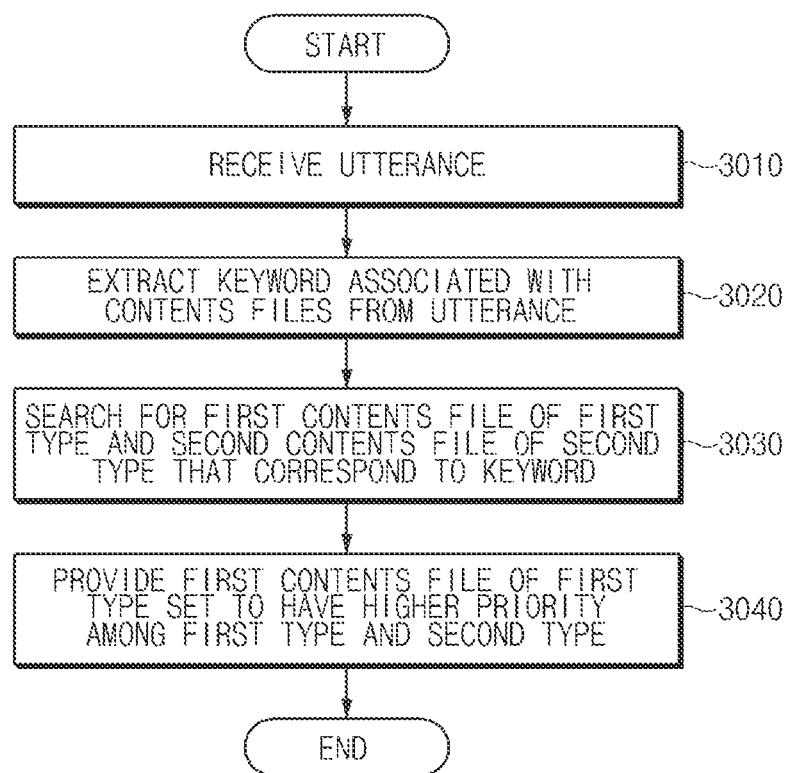
FIG. 3 is a flowchart of a method for providing contents based on an utterance according to an embodiment.
Figure 4:
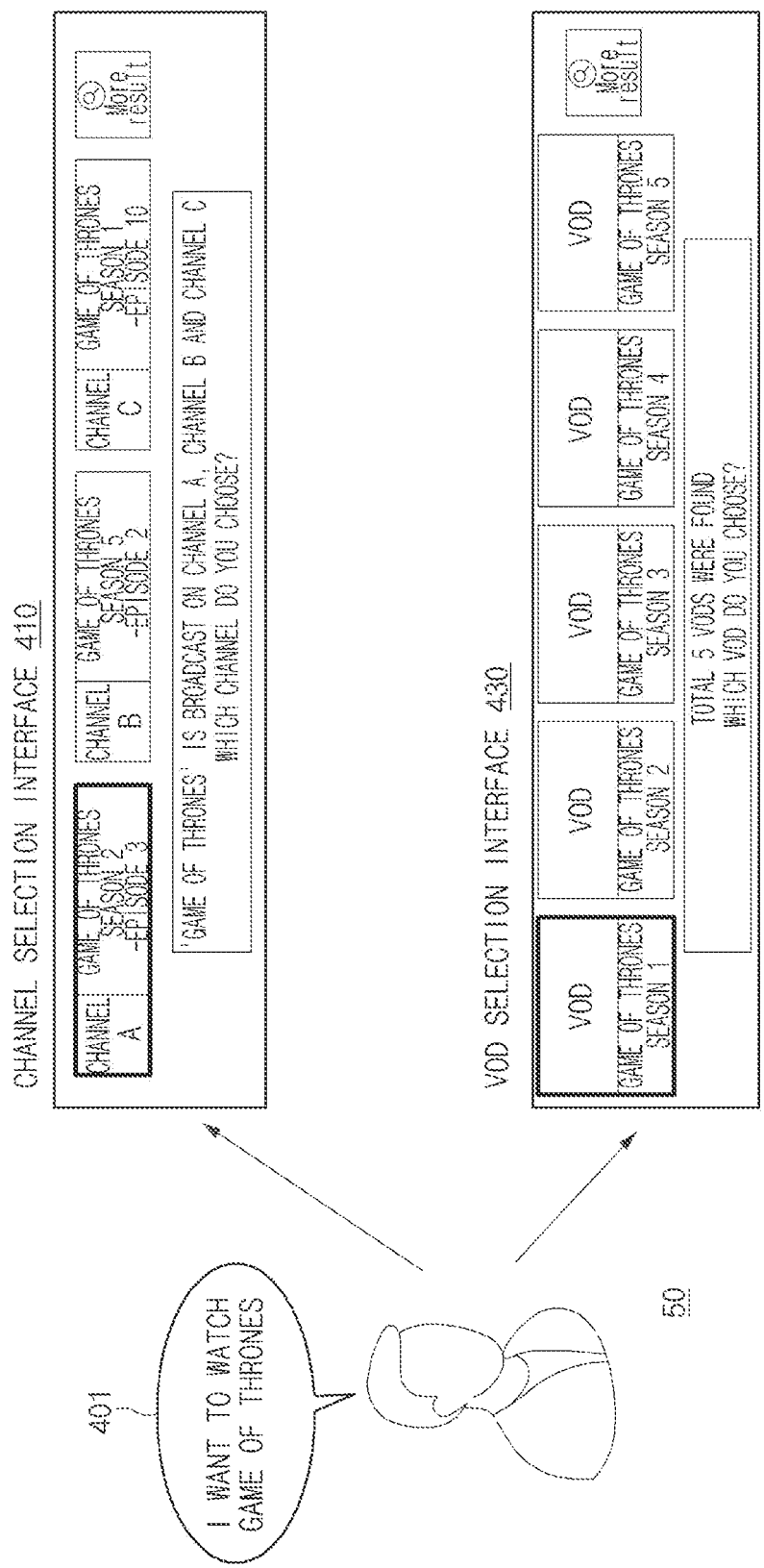
FIG. 4 is a view for describing a scenario of a method for providing broadcast contents according to various embodiments.

FIG. 3 is a flowchart of a method for providing contents based on an utterance according to an embodiment. FIG. 4 is a view for describing a scenario of a method for providing broadcast contents according to various embodiments.

Referring to FIG. 3, a method for providing contents based on utterance according to an embodiment may include operation 3010 to operation 3040. For example, operation 3010 to operation 3040 may be performed by the contents providing system 10 illustrated in FIG. 1 or the one or more servers 300 illustrated in FIG. 2. For example, operation 3010 to operation 3040 may be respectively implemented with instructions capable of being performed (or executed) by the processor 310 of the one or more servers 300. For example, the instructions may be stored in a computer-readable recording medium or the memory 330 (e.g., the storage 330 of FIG. 2) of the one or more servers 300. Hereinafter, in the descriptions about operation 3010 to operation 3040, a description that is the same as the description given with reference to FIG. 2 may not be repeated here.

The contents providing system 10 according to various embodiments may include an electronic device (e.g., the electronic device 100 of FIG. 2) including a voice signal receiving circuit (e.g., the voice signal receiver 140 in FIG. 2) and a display (e.g., the display 130 in FIG. 2). The contents providing system 10 may be a part of the electronic device or may include at least one processor (e.g., the processor 110 or the processor 310 in FIG. 2) that communicates remotely with the electronic device. While the contents providing system 10 is operatively connected to the at least one processor, the contents providing system 10 may include at least one memory (e.g., the memory 150 or the storage 330 in FIG. 2) residing on or outside the electronic device.

Hereinafter, a method of providing contents according to an embodiment will be described with reference to FIGS. 3 and 4. A method of providing broadcast contents is described as an example.

In operation 3010, the contents providing system 10 may obtain utterance through the voice signal receiver 140. The utterance may be referred to as a voice command for making a request for specific contents.

In operation 3020, the contents providing system 10 may extract a keyword associated with a plurality of contents files stored in the contents database 332 of the contents providing system 10, from the obtained utterance.

Referring to FIG. 4, a user 50 may perform an utterance saying that 'I want to watch Game of Thrones'. The utterance 401 may be referred to as a voice command for making a request for the playback or execution of the contents associated with 'Game of Thrones'. The contents providing system 10 may extract 'Game of Thrones' from the utterance 401 as a keyword.

In an embodiment, the contents providing system 10 may store keywords associated with contents in the memories 150 and 330 in advance. For example, the information included in meta data of contents, such as contents names, contents types, and the like may be stored as keywords in advance. The contents providing system 10 may convert the obtained utterance into a text and may determine whether the converted text includes pre-stored keywords. The word matched with the pre-stored keywords may be extracted as a keyword.

In an embodiment, at least one memory 150 or 330 may store contents corresponding to a plurality of types. For example, at least one memory 150 or 330 may store a contents database (e.g., the contents database 332) that stores a plurality of contents files corresponding to one of a first type and a second type.

In operation 3030, the contents providing system 10 may search for contents files corresponding to the keyword. For example, the contents providing system 10 may search for the first contents file of the first type and the second contents file of the second type, which correspond to the extracted keyword.

In operation 3040, the contents providing system 10 may display a screen according to the playback or execution of at least one contents file of the first type, through the display 130. For example, the priority of the first type may be set to be higher than the priority of the second type. The contents providing system 10 may play or execute only the contents file having a high priority among the found contents files and may output a screen according to the contents file.

For example, the contents providing system 10 may search for contents files of a broadcast type and VOD contents files corresponding to the keyword of 'Game of Thrones'. The contents file of the broadcast type may be set to have a higher priority than the VOD contents file. The contents providing system 10 may display the contents file of a broadcast type through the display 130. For example, the contents files being broadcast through a specific channel may be played.

In various embodiments, the contents providing system 10 may search for a plurality of contents files of the same type corresponding to the extracted keyword. In various embodiments, when the plurality of contents files of the same type corresponding to the extracted keyword are found, the contents providing system 10 may provide selection interfaces 410 and 430 for obtaining a selection input to one of the plurality of contents files.

Referring to the channel selection interface 410 of FIG. 4, for example, the contents of a broadcast type corresponding to a keyword of 'Game of Thrones' may include contents broadcast on channel A, contents broadcast on channel B, and contents broadcast on channel C. In this case, the interface 410 selectable from a plurality of found contents files may be provided.

The electronic device 100 may obtain a selection input to one of contents files of the broadcasting type having the same keyword through the channel selection interface 410. A plurality of contents files of the broadcast type for 'Game of Thrones' being the keyword included in the utterance of the user 50 may be found. For example, 'Game of Thrones' may be broadcast on channel A, channel B, and channel C at a point in time when the utterance of user 50 is obtained. The contents providing system 10 may receive a selection input to any one of contents files associated with 'Game of Thrones' broadcast on channel A, channel B, and channel C through the channel selection interface 410. The contents providing system 10 may provide contents of a broadcast type of the selected channel in response to receiving the selection input.

The VOD selection interface 430 may obtain a selection input to one of VOD contents files having the same keyword. A plurality of VOD contents files for 'Game of Thrones' being the keyword included in the utterance of the user 50 may be found. For example, when there is no channel on which the contents associated with 'Game of Thrones' are broadcast in real time at a point in time when the utterance of the user 50 is obtained, the found results for VOD contents files may be displayed through the VOD selection interface 430. The contents providing system 10 may receive a selection input to one of VOD contents files of 'Game of Thrones season 1' to 'Game of Thrones season 5' through the VOD selection interface 430. The contents providing system 10 may provide the selected VOD contents in response to receiving the selection input.

In various embodiments, the selection interfaces 410 and 430 may be found depending on keywords included in an utterance and may include a button (e.g., a "view more" button or a more result button) for displaying undisplayed contents and information about the contents. The user 50 may select the button to identify contents having low priority that are not currently displayed on a screen. Accordingly, the contents providing system 10 may display the various found contents on the display 130.

FIG. 5 is a view for describing a method of providing broadcast contents according to various embodiments.

According to various embodiments, the contents providing system 10 providing broadcast contents may store a broadcast channel name, information included in meta data of a live-stream channel, the name of VOD contents, and an application name, in the contents database 332 as keywords. The keyword analysis module 314 of the server 300 may extract a pre-stored keyword from an utterance and may search for the contents file corresponding to the extracted keyword in the contents database 332. For example, contents files may be stored in the contents database 332 by being mapped onto the keywords associated with respective contents.

In various embodiments, the electronic device 100 may store an application associated with a broadcasting contents providing service in the memory 150. The electronic device 100 may execute an application and may play or execute contents provided through the application. For example, when the user's utterance includes the keyword associated with an application, the contents providing system 10 may transmit a control signal, which make it possible to execute the application, to the electronic device 100. The electronic device 100 may execute the application in response to receiving the control signal and may display the execution screen of the application through the display 130.

In various embodiments, real-time broadcast contents, VOD contents, and application contents may have different priorities from one another. The contents providing system 10 may set the real-time broadcast contents to have a first priority, may set the VOD contents to have a second priority, and may set the application contents to have a third priority. For example, the meta data of each contents file may include information about a type of contents file and the priority for the type of contents file. Alternatively, referring to FIG. 5, the contents providing system 10 may specify priorities according to types of contents as illustrated in the table 500 of FIG. 5. For example, the table 500 may be stored in the contents database 221 in the form of a table.

For example, when the broadcast channel name is extracted as a keyword and the contents file is found by the keyword, the contents providing system 10 may directly provide the electronic device 100 with a broadcasting contents file of the broadcasting channel in the form of streaming data. Besides, the electronic device 100 may play the provided streaming data.

For example, the user may utter the name of the channel to be played, but may utter the information associated with the channel currently being broadcast. The information associated with the channel may be included in the meta data of the channel. When the broadcast channel name and the information included in channel meta data are extracted as a keyword and the contents file is found by the keywords, the contents providing system 10 may provide a channel selection interface (e.g., the channel selection interface 410 in FIG. 4) to the electronic device 100. Furthermore, the electronic device 100 may display the provided channel selection interface through the display 130. When a selection input to a specific channel is received from the electronic device 100, a real-time broadcast contents file of the specific channel may be provided to the electronic device 100 in the form of streaming data.

For example, when the broadcast channel name and a VOD contents name are extracted as keywords and the contents file is found by the keywords, the contents providing system 10 may determine that contents intended by the user are contents of the broadcast channel, depending on a predetermined priority. The contents providing system 10 may provide the electronic device 100 with a real-time broadcasting contents file of the broadcasting channel in the form of streaming data. As the priority of the real-time broadcast contents is set to be wider than the priority of the VOD contents, the contents providing system 10 may provide only the real-time broadcast contents to the electronic device 100.

For example, when the VOD contents name and an application name are extracted as keywords and the contents file is found by the keywords, the contents providing system 10 may determine that contents intended by the user are the VOD contents, depending on a predetermined priority. The contents providing system 10 may provide the VOD contents to the electronic device 10. In various embodiments, when a plurality of VOD contents corresponding to a keyword are found, the contents providing system 10 may transmit a control signal to the electronic device 100 to display a VOD selection interface (e.g., the VOD selection interface 430). The electronic device 100 may display the VOD selection interface through the display 130 in response to receiving a control signal.

Figure 6:
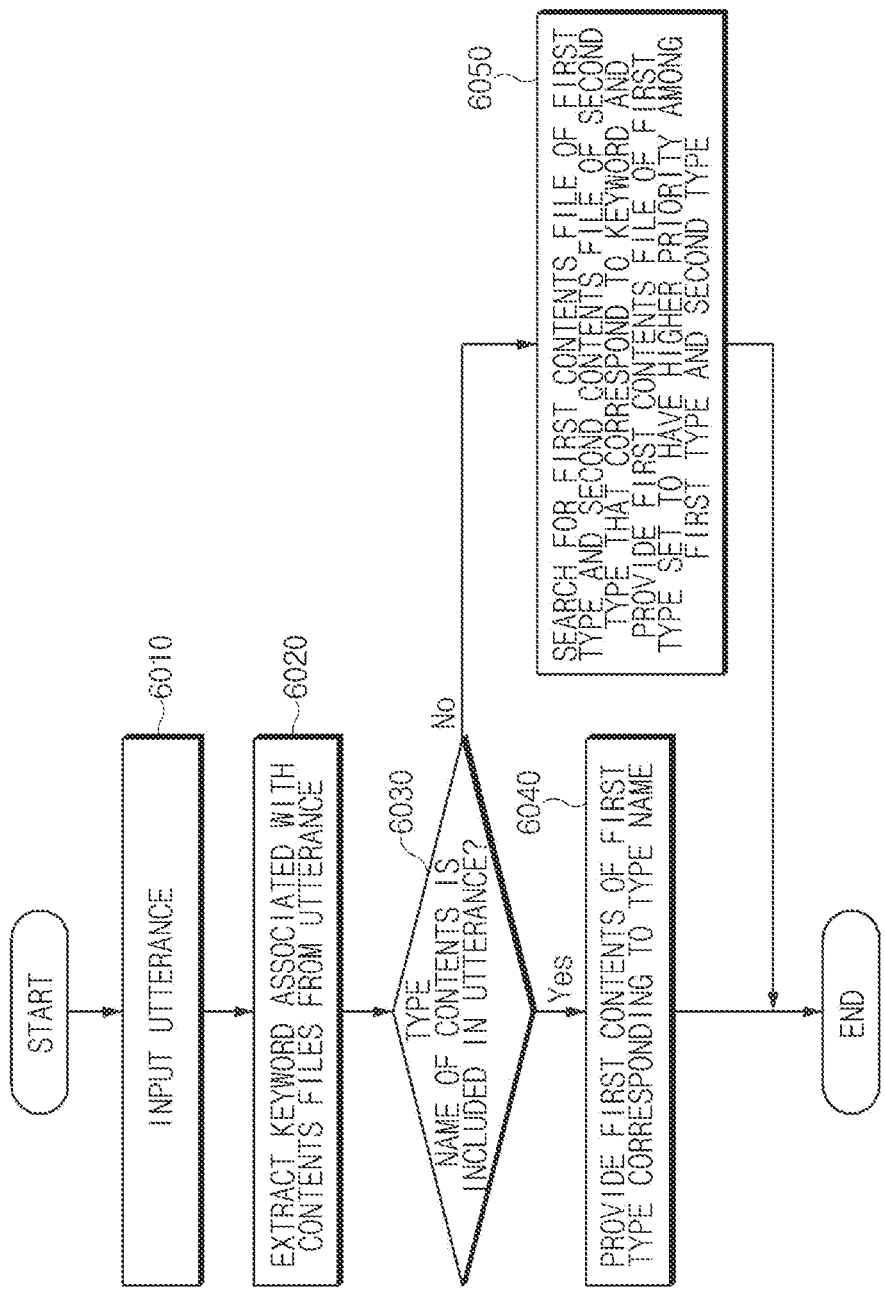
FIG. 6 is a flowchart of a method for providing contents based on an utterance according to various embodiments.
Figure 7:
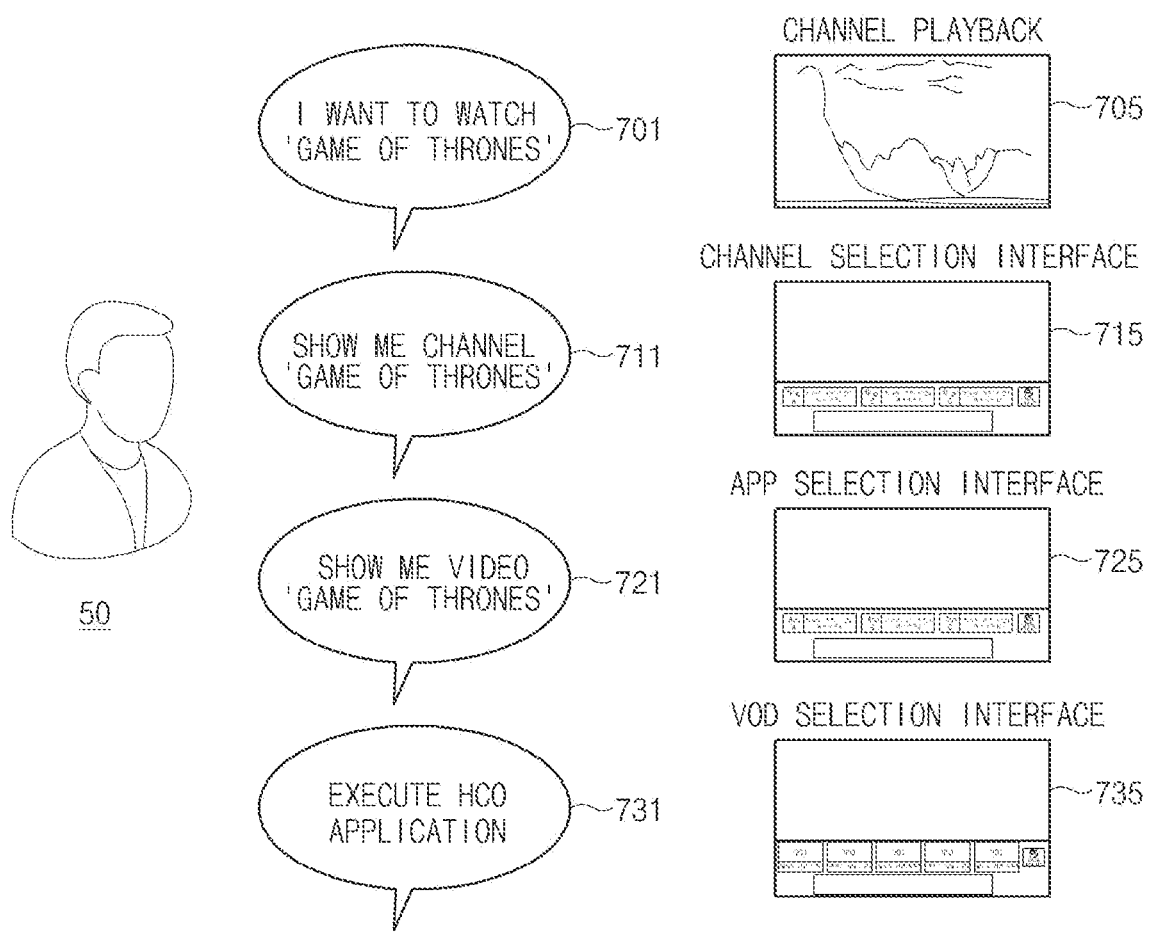
FIG. 7 is a view for describing a scenario of a method for providing broadcast contents according to various embodiments.

FIG. 6 is a flowchart of a method for providing contents based on an utterance according to various embodiments. FIG. 7 is a view for describing a scenario of a method for providing broadcast contents according to various embodiments.

Referring to FIG. 6, a method for providing contents based on utterance according to various embodiments may include operation 6010 to operation 6050. For example, operation 6010 to operation 6050 may be performed by the contents providing system 10 illustrated in FIG. 1 or the one or more servers 300 illustrated in FIG. 2. Operation 6010 and operation 6020 may correspond to operation 3010 and operation 3020, and operation 6050 may correspond to operation 3030 and operation 3040 in FIG. 3. Hereinafter, in the descriptions about FIG. 6, a description that is the same as the description given with reference to FIG. 3 may not be repeated here. Hereinafter, according to various embodiments, a method of providing broadcast contents will be described as an example with reference to FIGS. 6 and 7.

In operation 6010, the contents providing system 10 may obtain utterance through the voice signal receiver 140. In operation 6020, the contents providing system 10 may extract a keyword associated with a plurality of contents files stored in the contents database 332 of the contents providing system 10, from the obtained utterance.

In various embodiments, the utterance of the user 50 may include keywords associated with the type of contents. The contents providing system 10 may store keywords for the type of contents provided in a contents providing service, in the contents database 332. For example, the contents providing system 10 providing broadcast contents may store 'channel', 'video', and 'application' as keywords.

In operation 6030, the contents providing system 10 may determine whether a type name of contents is included in an utterance. For example, the contents providing system 10 may determine whether an utterance includes keywords of 'channel', 'video', or 'application'.

In operation 6040, the contents providing system 10 may search for a contents file of a type corresponding to the contents type name included in the utterance and may provide the found contents file.

For example, referring to FIG. 7, because the utterance 711 of the user 50 includes the keyword of 'channel', the contents providing system 10 may provide real-time broadcast contents that broadcast 'Game of Thrones'. The electronic device 100 may display a broadcast screen 705 through the display 130.

For example, the utterance 721 of the user 50 includes the keyword of 'video', the contents providing system 10 may provide the electronic device 100 with VOD contents associated with 'Game of Thrones'. In particular, when there are a plurality of VOD contents files associated with 'Game of Thrones', the electronic device 100 may display a screen 735 including the VOD selection interface through the display 130.

For example, because the utterance 731 of the user 50 includes the keyword of 'application', the contents providing system 10 may transmit a control signal to the electronic device 100 such that the application associated with 'HCO' is executed. The electronic device 100 may execute an HCO application. For example, the user 50 may receive desired contents through the executed HCO application.

In various embodiments, the contents providing system 10 may obtain list information about applications installed in the electronic device 100. The contents providing system 10 may search for applications capable of being executed by the electronic device 100, from the list information. When there are a plurality of found applications, the contents providing system 10 may transmit a control signal such that the electronic device 100 displays a screen 725 including an app selection interface selectable from a plurality of applications. In another example, when the application corresponding to the user's utterance is not included in the list information, the contents providing system 10 may provide the electronic device 100 with a link capable of installing the corresponding application. Alternatively, the contents providing system 10 may transmit a control signal to the electronic device 100 to display a guide message for providing a notification that the application is not installed.

When the content type name is not included in the utterance, in operation 6050, the contents providing system 10 may search for the first contents file of the first type and the second contents file of the second type, which correspond to the extracted keyword. The contents providing system 10 may display a screen according to the playback or execution of at least one contents file of the first type having a high priority, through the display 130. For example, when the contents type name is not included in an utterance 701, the contents providing system 10 may provide the user 50 with one of the screen 705, the screen 715, the screen 725, and the screen 735 in response to the contents found depending on the keyword.

Figure 8:
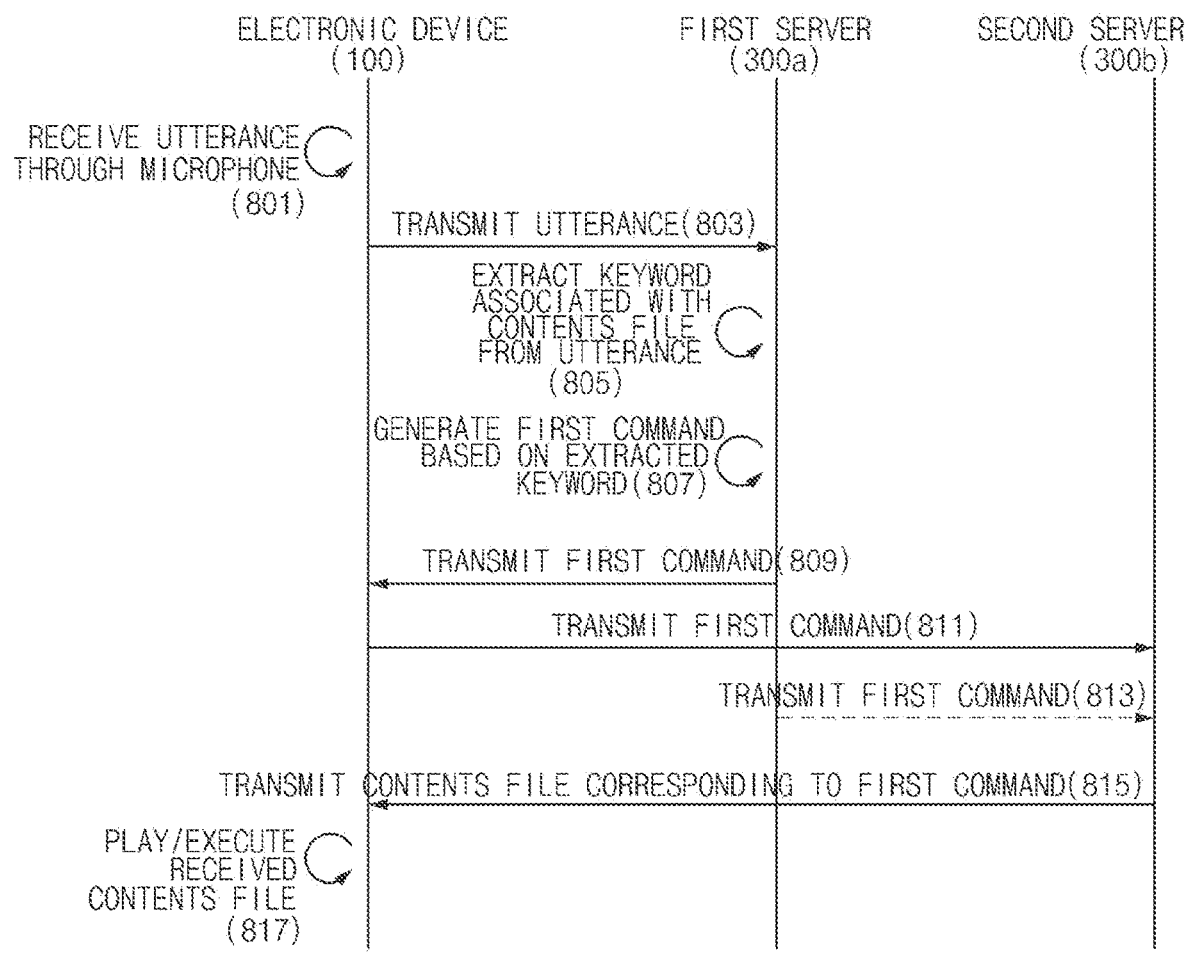
FIG. 8 is an operation sequence of a contents providing system according to various embodiments.

FIG. 8 is an operation sequence of a contents providing system according to various embodiments.

Referring to FIG. 8, the contents providing system according to various embodiments (e.g., the contents providing system 10 of FIG. 1) may include the electronic device 100 (e.g., the electronic device 100 of FIG. 2), a first server 300a, and a second server 300b. For example, the first server 300a and the second server 300b may be referred to as a server device performing at least some operations of the server 300 of FIG. 2. The first server 300a and the second server 300b may be configured to include at least some components of the server 300 of FIG. 2.

In an embodiment, the first server 300a may be referred to as a server performing a speech recognition function. The first server 300a may include at least one first processor (e.g., the processor 310 of FIG. 2) providing a speech recognition service.

In an embodiment, the second server 300b may be referred to as a server performing a function of providing contents. The second server 300b may include at least one second processor (e.g., the processor 310 in FIG. 2) supporting a contents providing service, and storage (e.g., the storage 330 of FIG. 2) storing the contents database (e.g., the contents database 332 of FIG. 2) storing a plurality of contents files corresponding to one of the first type and the second type. The first server 300a and the second server 300b may cooperate with each other to support the contents providing service.

In an embodiment, the electronic device 100 may receive an utterance through the voice signal receiver 140 (801). The electronic device 100 may transmit the received utterance to the first server 300a (803).

In an embodiment, the first server 300a may extract a keyword associated with the contents file from the utterance (805). The first server 300a may generate a first command based on the extracted keyword (807). For example, when the contents database includes at least one contents file of the first type and at least one contents file of the second type that correspond to the extracted keyword, the first server 300a may generate a first command for making a requesting for at least one contents file of the first type.

In an embodiment, the first server 300a may transmit the generated first command to the electronic device 100 (809). The electronic device 100 may transmit the received first command to the second server 300b (811). In another embodiment, the first server 300a may transmit the generated first command to the second server 300b (815). Operation 809, operation 811, and operation 815 may be performed alternatively.

In an embodiment, when the second server 300b receives the first command from the electronic device 100, the second server 300b may transmit the contents file corresponding to the first command to the electronic device 100 (815). For example, the second server 300b may transmit the at least one contents file of the first type to the electronic device 100 in response to receiving a command.

According to various embodiments, at least part of a device (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:
a signal receiver;
a voice input receiver;
a display;
a communicator; and
a processor configured to:
receive a first user voice input corresponding to a content through the voice input receiver while a screen corresponding to a signal received through the signal receiver is displayed on the display,
based on the content corresponding to a broadcast content, control the display to display a first user interface (UI) including information of a plurality of channels through which the content received from an external server through the communicator is being broadcast together with the screen corresponding to the signal,
receive a second user voice input for selecting one of the plurality of channels through the voice input receiver while the first UI is displayed on the display,
control the display to display a screen corresponding to a channel selected through the second user voice input,
based on the content corresponding to a video on demand (VOD) content, control the display to display a second UI including a plurality of information corresponding to the content received from the external server through the communicator together with the screen corresponding to the signal,
receive a third user voice input for selecting one of the plurality of information through the voice input receiver while the second UI is displayed on the display, and
control the display to display a screen corresponding to information selected through the third user voice input.

2. The display device of claim 1, wherein a priority of the broadcast content is higher than a priority of the VOD content.

3. The display device of claim 1, wherein the processor is further configured to:
control the display to display a screen including an UI for obtaining a selection input for one of information corresponding to the broadcast content or information corresponding to the VOD content.

4. The display device of claim 3, wherein the processor is further configured to:
based on the selection input being obtained through the UI, perform a function related to a content file corresponding to information selected from among the information on the broadcast content or information on the VOD content.

5. The display device of claim 1, wherein the processor is further configured to:
based on the first user voice input including a keyword associated with the VOD content and not including a keyword associated with the broadcast content, perform a function related to a content file corresponding to the VOD content.

6. The display device of claim 1, wherein the second user voice input includes a name of the channel selected through the user from among the plurality of channels.

7. The display device of claim 1, wherein the processor is further configured to:
control the display to display information including the broadcast content and the VOD content,
receive an input for selecting a content from among the broadcast content and the VOD content through the information,
control the display to display the selected content.

8. The display device of claim 1, wherein the processor is further configured to:
based on the first user voice input including a keyword associated with the broadcast content and a keyword associated with the VOD content, control the display to display a screen associated with the broadcast content.

9. The display device of claim 1, further comprising:
a memory configured to store at least one application providing the broadcast content and the VOD content,
wherein the processor is further configured to:
based on the first user voice input including a keyword associated with the at least one application, perform a function corresponding to the at least one application.

10. The display device of claim 9, wherein the at least one application includes a first application and a second application,
wherein the processor is further configured to:
based on the first user voice input including a keyword associated with the at least one application, control the display to display information for obtaining a selection input for one of the first application and the second application.

11. A method for controlling a display device, comprising:
receiving a first user voice input corresponding to a content while a screen corresponding to a received signal is displayed on a display of the display device;
based on the content corresponding to a broadcast content, displaying a first user interface (UI) including information of a plurality of channels through which the content received from an external server is being broadcast together with the screen corresponding to the signal;
receiving a second user voice input for selecting one of the plurality of channels while the first UI is displayed on the display;
controlling the display to display a screen corresponding to a channel selected through the second user voice input;
based on the content corresponding to a video on demand (VOD) content, displaying a second UI including a plurality of information corresponding to the content received from the external server together with the screen corresponding to the signal;
receiving a third user voice input for selecting one of the plurality of information through the voice input receiver while the second UI is displayed on the display; and
controlling the display to display a screen corresponding to information selected through the third user voice input.

12. The method of claim 11, wherein a priority of the broadcast content is higher than a priority of the VOD content.

13. The method of claim 11, further comprising:
controlling the display to display a screen including an UI for obtaining a selection input for one of information corresponding to the broadcast content or information corresponding to the VOD content.

14. The method of claim 13, further comprising:
based on the selection input being obtained through the UI, performing a function related to a content file corresponding to information selected from among the information on the broadcast content or information on the VOD content.

15. The method of claim 11, further comprising:
based on the first user voice input including a keyword associated with the VOD content and not including a keyword associated with the broadcast content, performing a function related to a content file corresponding to the VOD content.

16. The method of claim 11, wherein the second user voice input includes a name of the channel selected through the user from among the plurality of channels.

17. The method of claim 11, further comprising:
controlling the display to display information including the broadcast content and the VOD content;
receiving an input for selecting a content from among the broadcast content and the VOD content through the information; and
controlling the display to display the selected content.

18. The method of claim 11,
based on the first user voice input including a keyword associated with the broadcast content and a keyword associated with the VOD content, controlling the display to display a screen associated with the broadcast content.

19. The method of claim 11, further comprising:
based on the first user voice input including a keyword associated with at least one application, performing a function corresponding to the at least one application.

20. The method of claim 19, wherein the at least one application includes a first application and a second application,
wherein the method further comprises:
based on the first user voice input including a keyword associated with the at least one application, controlling the display to display information for obtaining a selection input for one of the first application and the second application.

* * * * *